United States Patent
Moran et al.

(10) Patent No.: US 12,315,307 B2
(45) Date of Patent: *May 27, 2025

(54) INTEGRATED MOBILE PARKING APPLICATION AND SMART PARKING METER SYSTEM

(71) Applicant: Municipal Parking Services, Inc., Minnetonka, MN (US)

(72) Inventors: Mark J. Moran, New Richmond, WI (US); Richard W. Kelley, II, Eagan, MN (US); David E. Collins, Jr., Plymouth, MN (US); Steven B. Lane, Maple Grove, MN (US); Christopher W. Baldwin, St. Paul, MN (US); Marcus N. Schmidt, Minnetonka, MN (US); John J. Leier, Brooklyn Park, MN (US); Ian T. Bui, Bloomington, MN (US); Umarani Pandian, Durham, NC (US)

(73) Assignee: Municipal Parking Services, Inc., Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/829,195

(22) Filed: Sep. 9, 2024

(65) Prior Publication Data

US 2025/0005969 A1 Jan. 2, 2025

Related U.S. Application Data

(63) Continuation of application No. 18/106,360, filed on Feb. 6, 2023, now Pat. No. 12,087,098, which is a
(Continued)

(51) Int. Cl.
*G06Q 10/02* (2012.01)
*G07B 15/02* (2011.01)
(Continued)

(52) U.S. Cl.
CPC ............ *G07B 15/02* (2013.01); *G06Q 10/02* (2013.01); *G07C 1/30* (2013.01); *H04W 4/00* (2013.01); *H04W 4/02* (2013.01); *H04W 4/029* (2018.02)

(58) Field of Classification Search
CPC ........ G07B 15/02; H04W 4/029; H04W 4/00; H04W 4/02; G06Q 10/02; G07C 1/30
(Continued)

(56) References Cited

U.S. PATENT DOCUMENTS

2010/0280956 A1* 11/2010 Chutorash ............. G07F 13/025
  705/64
2014/0214499 A1* 7/2014 Hudson .................. G07B 15/02
  705/13
2017/0249625 A1* 8/2017 Vossoughi ......... G06Q 30/0266

FOREIGN PATENT DOCUMENTS

WO   WO-2015172161 A1 * 11/2015   ........... G06Q 20/045

OTHER PUBLICATIONS

Sacco, Al, "Hands-On With Boston's New Pay-by-Phone Parking App", Jan. 15, 2015, cio.com, 8 pages (Year: 2015).*
(Continued)

*Primary Examiner* — Shannon S Campbell
*Assistant Examiner* — Freda A Nelson
(74) *Attorney, Agent, or Firm* — Skaar Ulbrich Macari, P.A.

(57) ABSTRACT

A parking meter system includes a plurality of parking space monitors, a central computer system networked with the plurality of parking space monitors, and a user computing device. Each of the parking space monitors includes a weather resistant housing, a processor disposed inside of the housing, a memory disposed inside of the housing and coupled to the processor, a network interface disposed in the housing and coupled to the processor, and camera coupled to the processor and aimed towards a parking space to be
(Continued)

monitored. The user computing device is configured to transmit to a request for parking time, receive a purchase confirmation, and monitor a remaining purchased parking time which is synchronized to a parking timer countdown for a particular parking space where a user has parked that is being monitored by a particular one of the plurality of parking space monitors.

8 Claims, 8 Drawing Sheets

Related U.S. Application Data continuation of application No. 15/223,301, filed on Jul. 29, 2016, now Pat. No. 11,574,507.

(60) Provisional application No. 62/199,120, filed on Jul. 30, 2015.

(51) Int. Cl.
*G07C 1/30* (2006.01)
*H04W 4/00* (2018.01)
*H04W 4/02* (2018.01)
*H04W 4/029* (2018.01)

(58) Field of Classification Search
USPC .............................................................. 705/5
See application file for complete search history.

(56) References Cited

OTHER PUBLICATIONS

Golden, Erin, "Minneapolis to debut pay-by-phone parking meters", Mar. 25, 2015, startribune.com, 2 pages (Year: 2015).*
Patterson, Steve, "Parking in St. Louis? Get The Parkmobile App", May 5, 2015, urbanreviewstl.com, 5 pages (Year: 2015).*
"New MobileMeter App Simplifies Paying For Parking In Champaign", Apr. 1, 2015, champaignil.gov, 2 pages. (Year: 2015).*
"Mobile Parking App Arrives in Cincinnati", Jul. 23, 2015, cincinnati-oh.gov, 3 pages. (Year: 2015).*
Bishop, Todd, "Should you park there? App crunches data to predict parking ticket, theft", Mar. 21, 2012, geekwire.com, 6 pages. (Year: 2012).*

* cited by examiner

INTEGRATED MOBILE PARKING APPLICATION AND SMART PARKING METER SYSTEM

PRIORITY

This application is a continuation of U.S. patent application Ser. No. 18/106,360, filed Feb. 6, 2023, which is a continuation of U.S. patent application Ser. No. 15/223,301, filed Jul. 29, 2016, now U.S. Pat. No. 11,574,507, which claims the priority benefit of U.S. Provisional Application No. 62/199,120, filed on Jul. 30, 2015, and the entirety of the foregoing applications is hereby incorporated herein by reference.

FIELD

The present invention relates generally to parking systems and, more particularly, to a parking monitoring and payment system being interactive with a user's phone or mobile computing device.

BACKGROUND

There are a variety of mobile parking payment applications that allow a user to pay for parking time via a smart phone app. However, such mobile payment applications cannot talk directly to the actual parking meter monitoring the parking space where the user's vehicle is parked. Typically, the parking app provider must perform a reconciliation of their application data with the parking meter records of each given municipality. And worse, it is still possible that a user receives a parking ticket even though they supposedly paid for parking time or added time during a given parking event. This results in the need to perform further reconciliation and to inconvenience the consumer.

Adding redundant infrastructure to duplicate the parking monitoring function of a parking meter, just to enable a mobile parking application, is undesirable for many reasons, including installation cost and ongoing maintenance. Moreover, the duplicate infrastructure only mirrors the already-present metering system. It still cannot talk to the meters, so there is always the possibility that the overlaid monitoring system does not accurately reflect the status of the actual parking meter.

Conventional remote applications on a user's smart phone, commonly known as "pay-by-phone" parking applications, have no capability to communicate in real-time or near-real time with the user's specific parking meter to allow that meter to show the user/consumer any confirmation of purchase, or amount of time purchased, remaining time, etc. Thus, there is a need for such level of interactivity and integration between a consumer parking app and a network of parking meters.

SUMMARY

The present invention provides unique devices, systems and methods for managing parking events. In one aspect, a smart phone, or a mobile computing device, interacts with a smart parking meter to permit the user to complete a parking transaction without the need to exit their car. The transaction proceeds digitally and confirmation of the purchase is sent to the user's smartphone or via other electronic message means.

In another aspect, the user can access an interactive map via a smart phone application that provides real time status of the networked parking meters in a specific area. The user can view all meters meeting certain criteria, such as pricing and time to availability. The user can also reserve a particular parking space through the application. Meter status can be color-coded.

In a further aspect, the user can monitor the time remaining on their specific meter and purchase additional time, if permitted, in order to avoid a fine. The user can be provided with an alert at set intervals, such as 15 minutes and 5 minutes prior to their time expiring. Fines can also be paid via the app on the smartphone.

The application also knows where the user parked their car, so the application can be used to find the user's car.

The smart meter system can provide a set of APIs to allow software developers to interact with the parking meters in uniform ways.

The mobile computing device can be the vehicle's onboard user interface system, a smart phone, a tablet computer, or other mobile computing device.

The disclosure includes an integrated mobile parking application and smart parking meter system. A plurality of parking meters can be configured to automatically monitor a parking space. A user computing device, comprising a processor, memory and graphical user interface, can be networked with the plurality of parking meters. The user computing device can be configured to transmit to a particular one of the plurality of parking meters a request for parking time, receive a purchase confirmation from the particular one of the plurality of parking meters, and monitor a remaining purchased parking time which is synchronized to a parking timer countdown of the particular one of the plurality of parking meters.

The disclosure further includes a method of conducting a parking event. The method can include transmitting to a particular one of the plurality of parking meters a request for parking time, receiving a purchase confirmation from the particular one of the plurality of parking meters, and monitoring a remaining purchased parking time which is synchronized to a parking timer countdown of the particular one of the plurality of parking meters.

Real time data for parking status can be obtained from the plurality of parking meters and presented to the user with a map or list of meters where parking is available. The user can be presented with a map or list of meters where parking is soon to become available.

A map application residing on the user's computing device can be launched to guide the user to one of the available meters presented to the user on the map or list of meters where parking is available.

A reservation request can be transmitted to the particular one of the plurality of parking meters. The status of the particular one of the plurality of parking meters can be changed to unavailable in response to the reservation request.

A map application residing on the user's computing device can be launched to guide the user to a location of the particular one of the plurality of parking meters from which the user received the purchase confirmation.

Data or information exchange between the particular one of the plurality of parking meters and the user computing device can be facilitated via a central control computer networked with the plurality of parking meters and with the user computing device.

A request for additional parking time can be transmitted by the user computing device to the particular one of the plurality of parking meters. The user computing device then receives an additional purchase confirmation from the particular one of the plurality of parking meters for the additional time, if permitted. Then the remaining purchased parking time indicated by the user computing device is incremented synchronously with the parking timer countdown of the particular one of the plurality of parking meters.

The particular one of the plurality of parking meters can be designated based upon the global positioning system location of the user computing device and a proximate distance from the user computing device to each of the plurality of parking meters. Alternatively, license plate identification data obtained by the particular one of the plurality of parking meters and the license plate data entered by the user via the user computing device can be matched up in order to designate the particular one of the plurality of parking meters.

The user can be presented with a parking violation notice in the event that the particular one of the plurality of parking meters determines that the user has committed a parking violation. The user can pay their fine via the user computing device.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
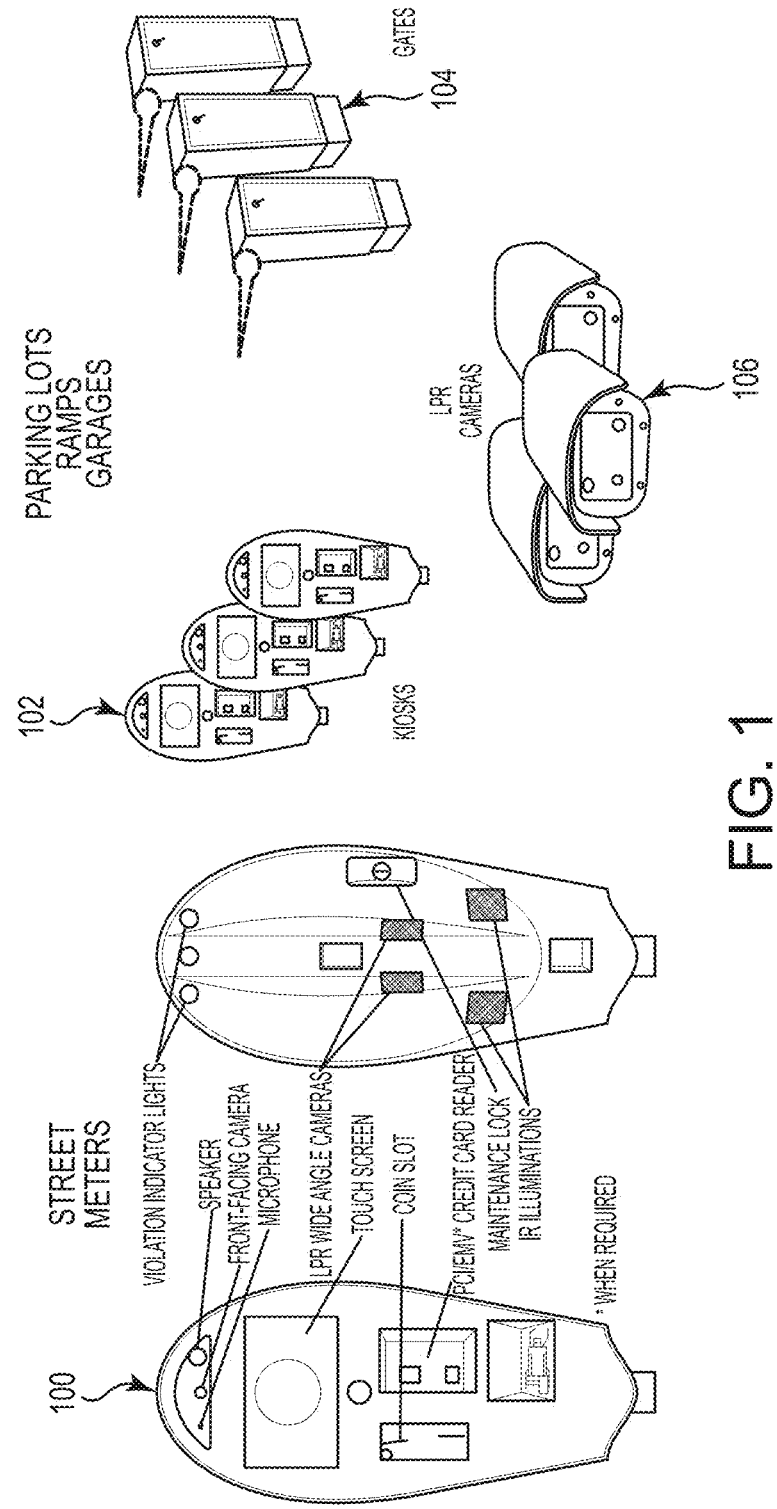
FIG. 1 is a diagram of various smart parking meter system components according to certain example embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Referring to FIG. 1, various components of a smart parking system are shown. Smart parking meters 100, such as those disclosed in U.S. Pat. Pub. Nos. 2014/0214499 A1 and 2014/0214500 A1 (which are both incorporated herein by reference in their entirety), can be deployed adjacent to various parking spaces. Such smart meters provide for smart parking monitoring where the meters can sense the presence of a vehicle in a parking space, determine the identity of the vehicle, permit the parking user to pay for parking, determine parking violation notices, and other intelligent functions. Each of the meters 100 is also networked with a central or control computer 108 for added control and functionality.

Each smart parking meter 100 includes a processor and physical memory coupled to the microprocessor. A computer readable program code can be stored in the physical memory (e.g., random access memory, flash memory or hard-drive) of the meter. The computer readable program code is configured such that when executed by the microprocessor, the code causes the meter to perform the steps of the invention described herein.

The same or similar smart parking meter 100 can also be configured as a kiosk 102 and placed adjacent a parking lot or ramp. The kiosk 102 is coupled to gates 104 and/or license plate reading (LPR) cameras 106 to monitor parking events at a lot, ramp or garage and control the flow of vehicles into and out of the parking facility.

A kiosk 102 can also simultaneously function as a parking meter 100. A single kiosk or meter 102 can further be coupled to one or more LPR cameras 106 that each monitor individual parking spaces so that the single kiosk or meter 102 monitors multiple individual parking spaces or events.

Note that when the term "meter" is used throughout this application, such use should be understood to include both smart meters 100 and kiosks 102.

Figure 2:
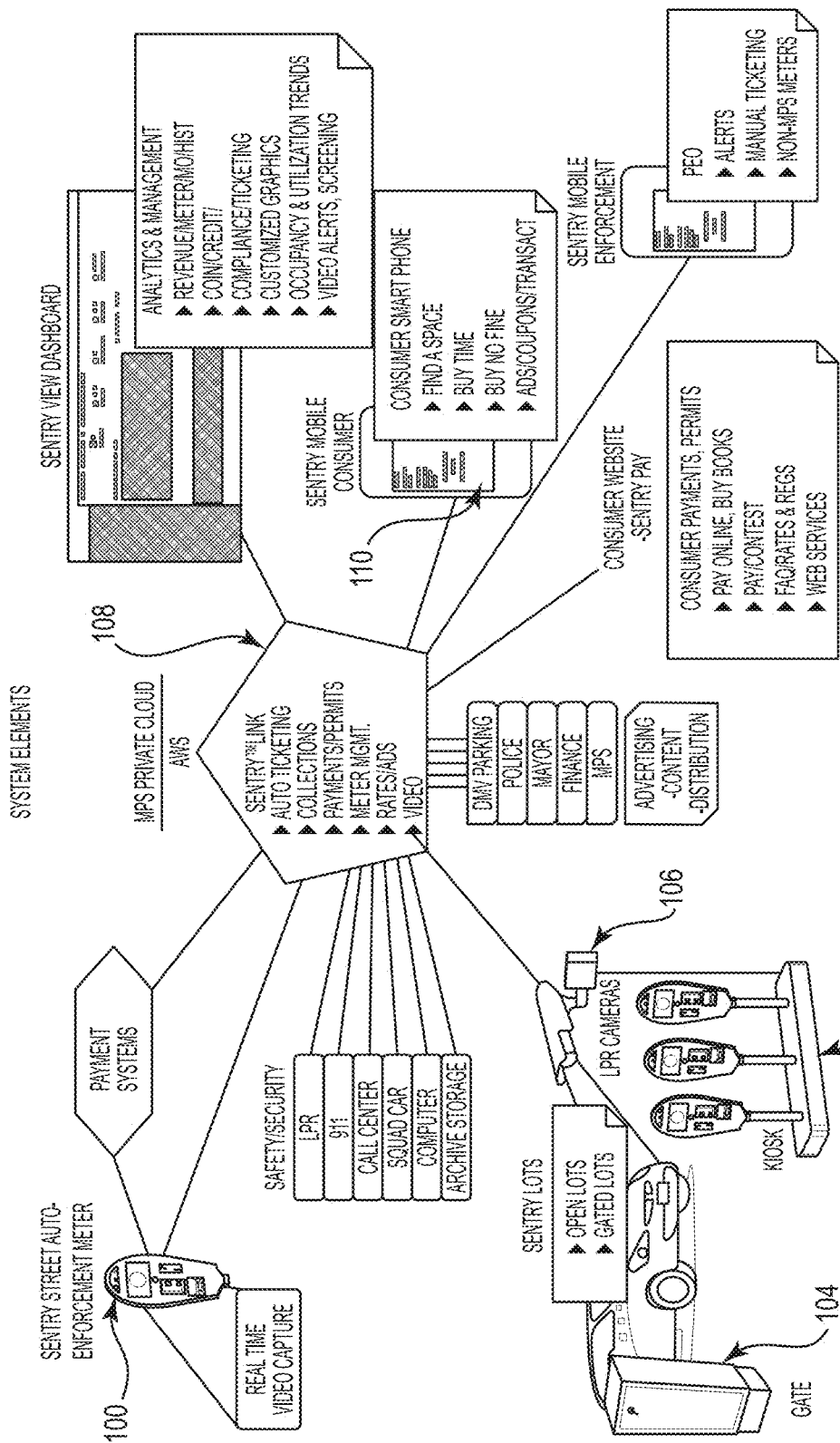
FIG. 2 is a diagram of various components of an integrated parking system according to certain example embodiments.

Referring to FIG. 2, each meter 100 and kiosk 102 is communicatively coupled or networked to the so-called cloud computing system 108 via the internet or other wired or wireless connection. The cloud computing system 108 can also be referred to as a central or control computer or server.

The cloud computing system 108 comprises one or more computer systems located remote from the meters and kiosks that is networked with the meters 100 and kiosks 102. The network can be wired or wireless, and the network can be either a private network (local area network or LAN) or a public network such as the world wide web (the Internet).

Computing devices 110 such as smart phones, tablet computers, laptops and personal computers can communicate with the meters 100 and kiosks 102 via the cloud server 108. The computing device 110 includes a microprocessor, physical memory coupled to the microprocessor, a graphical user interface, an input device (keyboard, mouse and/or touch-sensing display screen) and a network interface coupled to the microprocessor. The physical memory can be a non-transitory memory.

The network interface is configured to enable communication with a communication network (e.g. the Internet or World Wide Web), using a wireless connection (e.g. cellular such as LTE, Wi-Fi, etc.).

The memory in the user's computing device 110 may include one or more non-volatile storage devices and/or one or more volatile storage devices (e.g., random access memory (RAM)).

The user parking application can take the form of computer readable program code, which can be stored in the physical memory (e.g., random access memory, flash memory or hard-drive) of the user's computing device 110. The computer readable program code is configured such that when executed by the microprocessor, the code causes the user's computing device 110 to perform the steps of the invention described herein. In other embodiments, the invention can take the form of the computing device configured to perform the steps described below. In still further embodiments, the invention can take the form of a system of networked smart meters/kiosks, a cloud server and a user computing device. Other configurations will be apparent from the present disclosure.

In alternative embodiments, the software code for the parking application resides in the non-volatile memory of the central server. The user's computing device 110 then remotely interfaces with the software code via a web browser (e.g., using HTML 5 or equivalent). In this alternative, the parking application comprises a web application or web app.

Each smart meter 100 is in communication with the cloud server 108. Using application program interfaces (API's), the parking application stored and executing on the user's computing device 110 can communicate with the cloud server, thereby communicating or exchanging parking data with the individual parking meters 100 and kiosks 102.

The ability of the smartphone application of the user's computing device 110 to communicate or exchange data with the actual parking meter 100 provides the user with many features that are not possible with conventional parking software applications. The user can use the parking application to purchase additional parking time, pay fines, purchase fine avoidance insurance, look for available spaces, receive advertisements, receive coupons for businesses nearby their parking space, and conduct additional transactions that one could otherwise transact by physically interacting with the meter 100 and kiosk 102.

When the environment outside of the user's vehicle is unfriendly or uncomfortable, or if the user may not feel safe standing by the meter, the parking application allows the user to remain in their vehicle to complete the parking transaction via their smart phone or other computing device.

In use, a user can initiate a session with a specific smart meter 100 by launching the software application (i.e., app) on their smart phone or computing device 110, which can continuously run in the background.

The user's computing device 110 can be paired with the correct meter corresponding to their particular parking spot in several ways. The user's GPS coordinates can be matched up to the coordinates of the closest meter since the user is assumed to be in their vehicle. Or, a secondary signal such as NFC or Bluetooth can be broadcast from the meters and the user's smart phone can respond (e.g. via iBeacon methodology or similar), thus notifying the correct meter of the user's location. Or, the user can enter a unique meter code into their smart phone application.

In a further alternative, the user can enter their license plate number into the application on their computing device. Since the meters 100 are able to read vehicle license plate characters or identifications, the cloud server 108 can automatically match up the license plate or identification information entered via the parking application with the specific parking spot where the user's vehicle is parked.

Once the user and specific meter correspondence has been established, the user selects their desired parking duration, and then completes the rest of the parking transaction using the parking application on their computing device. The parking transaction information is relayed to the cloud computing system 108 and then to the specific meter 100 where the user's vehicle is parked. The meter 100 then sends a confirmation back to the user's computing device. A receipt can also be sent to the user via email, text or other means, if the user so desires.

The user's individual parking application will then begin indicating a parking time countdown to expiration. The parking application can run in the background of the user's computing device so that the user can consult their specific time remaining as often as they desire.

If the user needs to purchase additional parking time, assuming that additional time is permitted according to the particular parking rules in effect at that time, then the user can interface with their parking application to add additional time and pay accordingly-all without need to return to their vehicle or the particular meter where they are parked or to a kiosk. This convenient feature of adding parking time can allow the parking duration to be extended at the current parking rate, or at some enhanced rate in order to encourage space turnover, or as the municipality may designate.

The parking application can present the user with periodic reminders and warnings of impending expiration of their parking time. The parking application can also issue a violation notice to the user, if a violation is incurred. The user can even pay their fine via the parking application. A violation discount rate can be offered to encourage the user to pay their violation via the parking application within a specified time after the violation occurred.

In an additional aspect, the parking application can pull real-time meter status data from the particular meter where the user is parked via the central computer 108 and present the user with a graphic of the results on the user's computing device screen, such as a map report or other convenient format. This graphic allows a user to view available parking spaces in a chosen area. The user can even select a particular meter or parking space and select an option to have their computing device's default map program provide driving directions to the chosen space or meter.

The status map mentioned above can present enhanced status of meters beyond simply "occupied" and "available." For example, the user can be presented with "soon to expire" meters (e.g. less than 10 minutes remaining), which are assumed to soon become available. In one embodiment, the available meters can be colored green, the occupied meters red, and the soon to be available meters yellow.

In a further aspect, the user can choose to reserve an available space or a soon to be available space be selecting a particular meter on the map or list of meters presented on the screen of their computing device. Using a map or a list of meters, the user can select a reservation option via the parking application and choose a parking meter to reserve. To discourage abuse, the user parking period can be set to begin at the time their reservation is requested and paid, or a reservation fee can be levied. Also, the user will only be able to reserve one space, and no additional reservations can be made until their reserved parking event is concluded.

When a reservation is made, the particular reserved meter will display a "reserved" or "unavailable" or "no parking" of similar indication that will visibly indicate to other persons that the space is not currently available for parking. Upon the user entering their reserved space, their identification is verified by the presence (GPS locality) of their smart phone, or they enter a provided at reservation purchase PIN code at the smart meter, or the smart meter reads their license plate and matches with the parking application account used make the reservation.

Persons parking in spots reserved by others are issued an immediate violation notice, or a violation after a short grace period to allow the parker to leave after noticing that the space is not authorized for their parking.

Soon to become available spaces can also be reserved. Any such reservation will prevent the current parking occupant from adding additional time, and a notice to this effect can be presented to the current space occupant via their parking application.

A user who forgets their specific parking location can use a feature of the parking application to find their space via the parking application. The parking application knows both the meter location where the user's car is parked and the location of the user's computing device (via GPS coordinates or other means). Thus, the computing device's mapping program can be employed to provide the user with walking directions to their vehicle.

Referring now to FIGS. 3-13, use of the parking application according to certain example embodiments will be discussed. The smartphone application can include any one or more of the screen shots presented in FIGS. 3-13. The screen shots can also be altered in certain ways without departing from the scope of the invention. The dashed lines around each of the screen shots signifies that the particular depicted screen shot can be scaled to fit other screen sizes and proportions, or to fit within a portion of a larger window or a sub-window depicted on the computing device 110.

Figure 3:
FIGS. 3-13 are screen shots of a smart phone parking application according to certain example embodiments.

After the user activates the parking application on their smartphone or other computing device 110, a user "login" screen 120 is presented as shown in FIG. 3. The user can "register" an account via the application, or by alternately going to a registration website with a web browser window.

Figure 4:
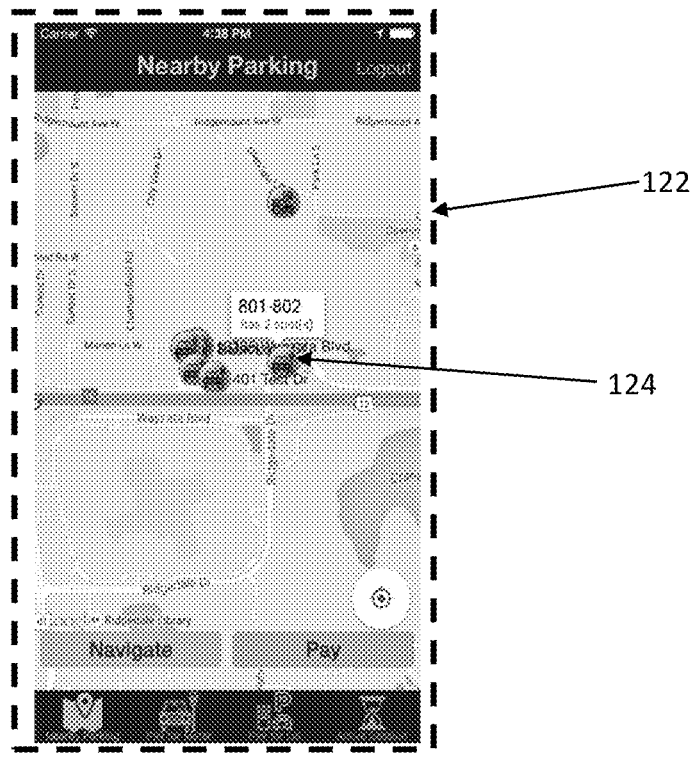

FIG. 4 shows a screen 122 presenting a map showing available parking spaces 124 nearby their smartphone's physical location. The available spots 124 are depicted in this example as overlaid on the map as little circles enclosing a car next to a meter. The user can select a specific space by tapping on their phone's screen to select a particular space, and then the application will provide options to launch the phone's map program ("Navigate") to provide directions to the selected space and additional options such as space reservation and purchase parking ("Pay").

Figure 5:
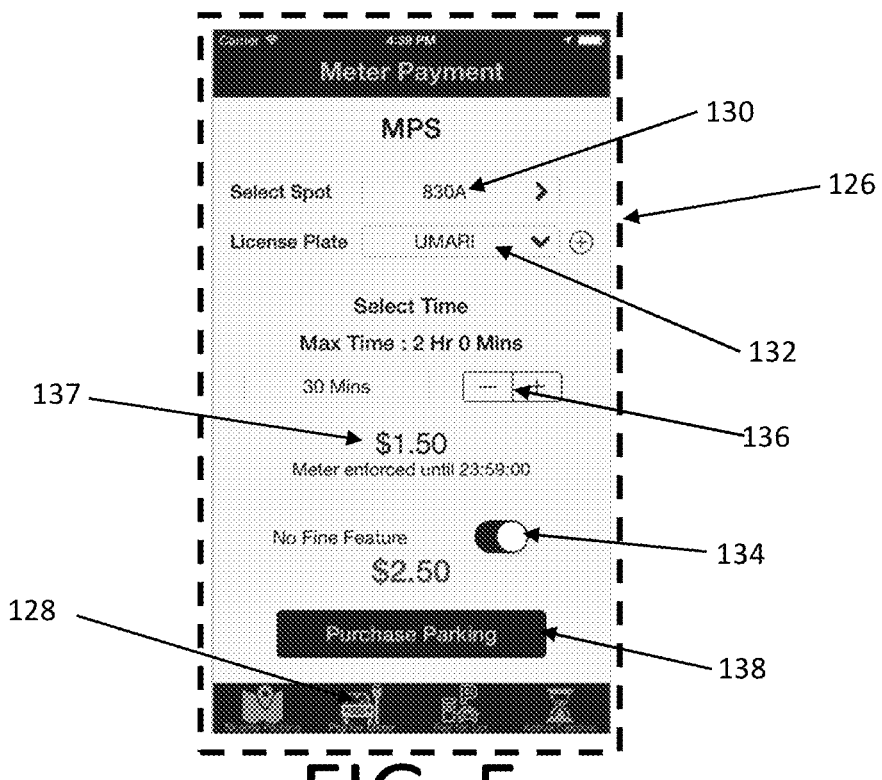

FIG. 5 shows a parking transaction screen 126 presented when the user selects the "Pay for Meter" option 128 on their navigation ribbon at the bottom of the screen in FIG. 4. The user can update the meter identification number ("select spot" 130) if necessary, enter their license plate code 132 if necessary, choose to purchase fine avoidance insurance 134, and select the desired amount of parking time 136 that the user wishes to purchase. The parking fee 137 corresponding to the selected parking time is also displayed.

Figure 6:
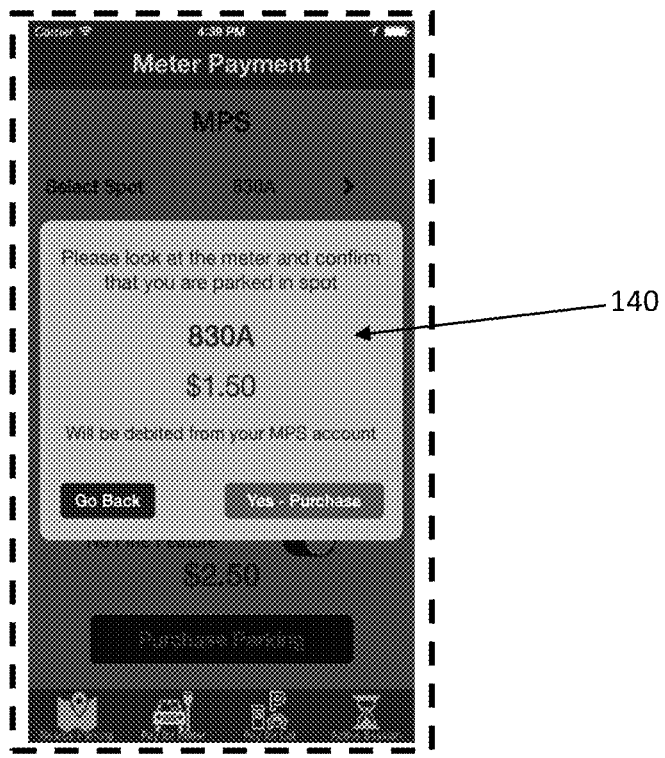
Figure 7:
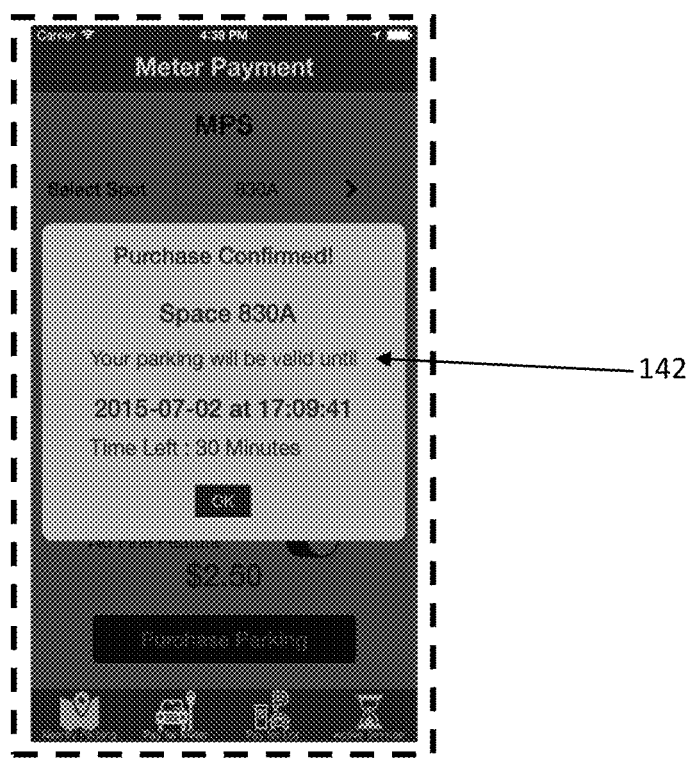

Selecting the "purchase parking" option 138 presents the user with a confirmation window 140 as shown in FIG. 6. The user can "go back" to the screen of FIG. 5 and make changes, or they can confirm their purchase ("Yes-Purchase") by selecting the appropriate option. Selecting the "Yes-Purchase" option then presents a purchase confirmation window 142 as shown in FIG. 7.

Figure 8:
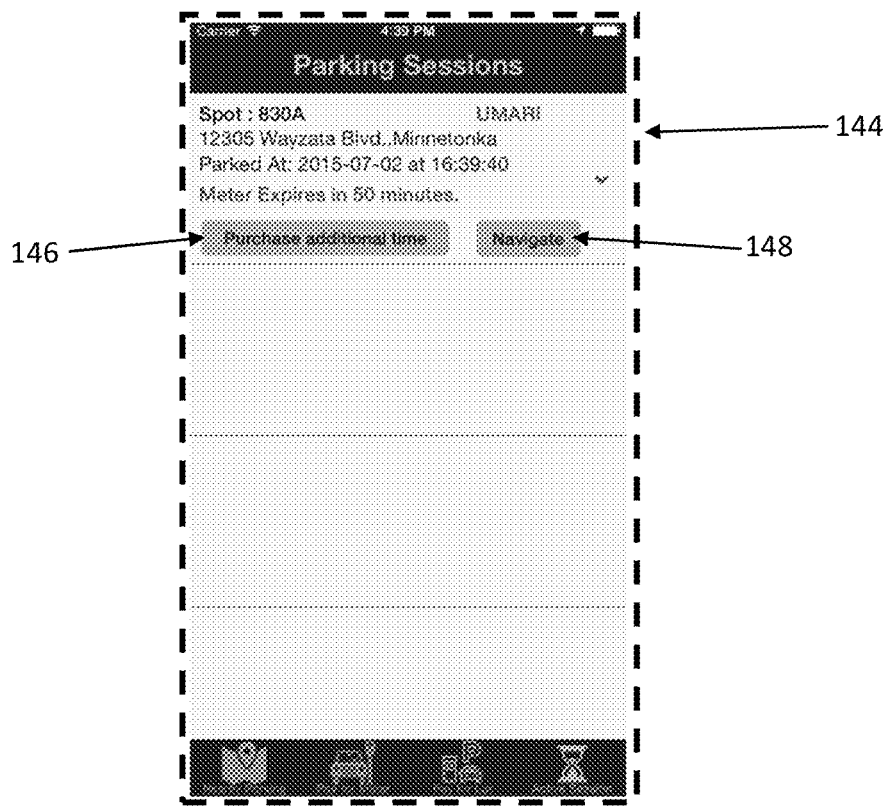
Figure 13:
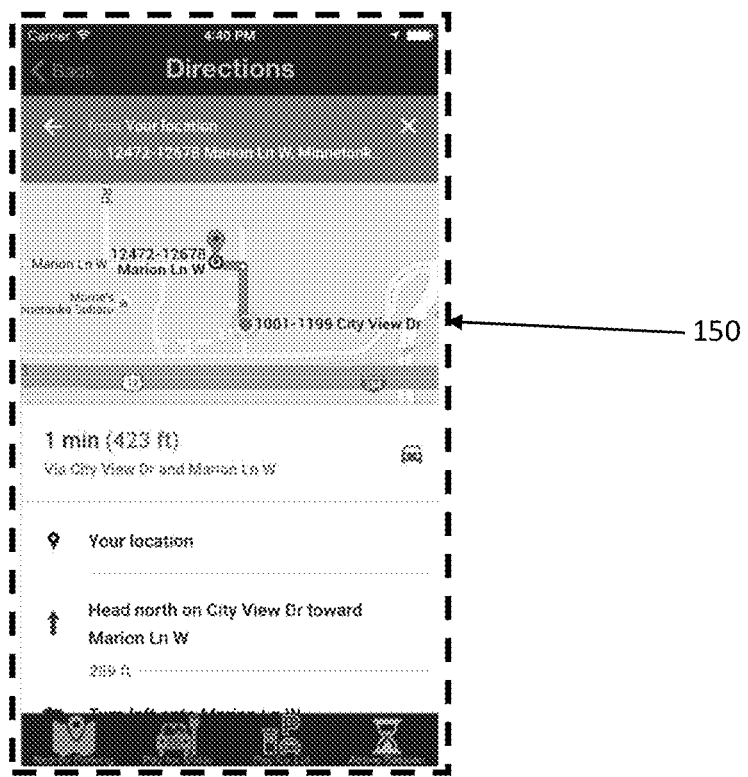

FIG. 8 is a parking sessions 144 summary screen presented to the user to allow the user to monitor the status of their active parking session. The user can see various parameters such as the parking spot identification code, meter location, parked time and time remaining on the meter in the summary. The user can select options to "purchase additional time" 146 in this screen, or can have the application generate map directions ("Navigate" 148) to assist the user in finding their vehicle. FIG. 13 shows an example of a navigation screen 150 providing directions to the user to assist the user in returning to their vehicle.

Figure 9:
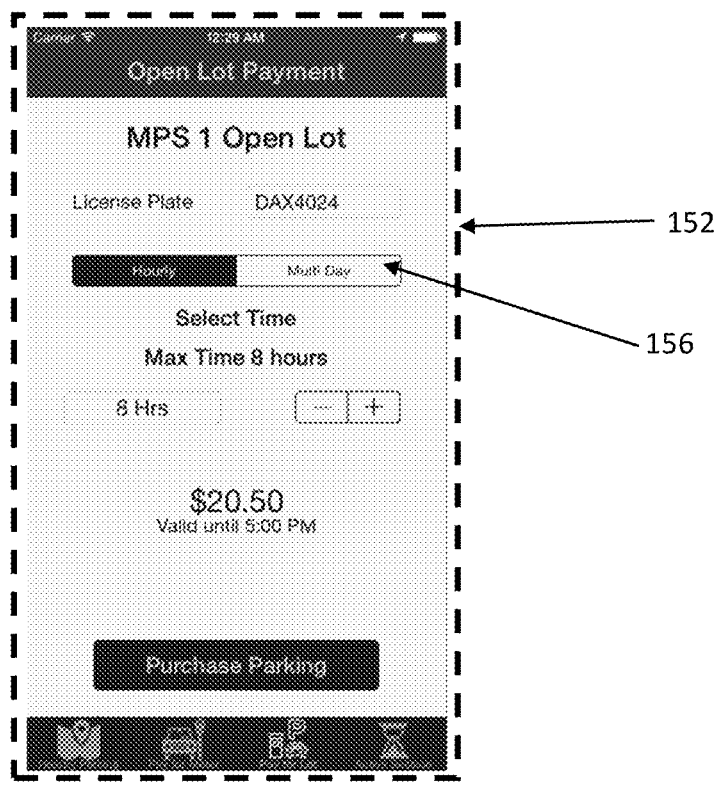
Figure 10:
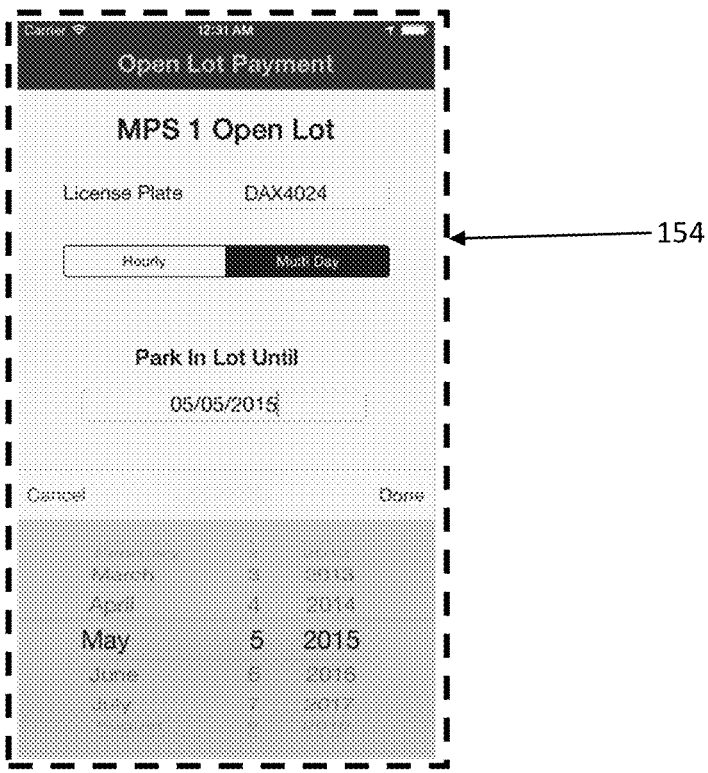

FIGS. 9-10 present alternative parking transaction screens 152, 154 that are directed towards parking lots versus individual metered spots. In FIG. 9, the user is presented with the ability to make hourly parking purchases. Selecting the "Multi Day" option 156 in FIG. 9 presents the user with the multi-day parking purchase screen 154 shown in FIG. 10.

Figure 11:
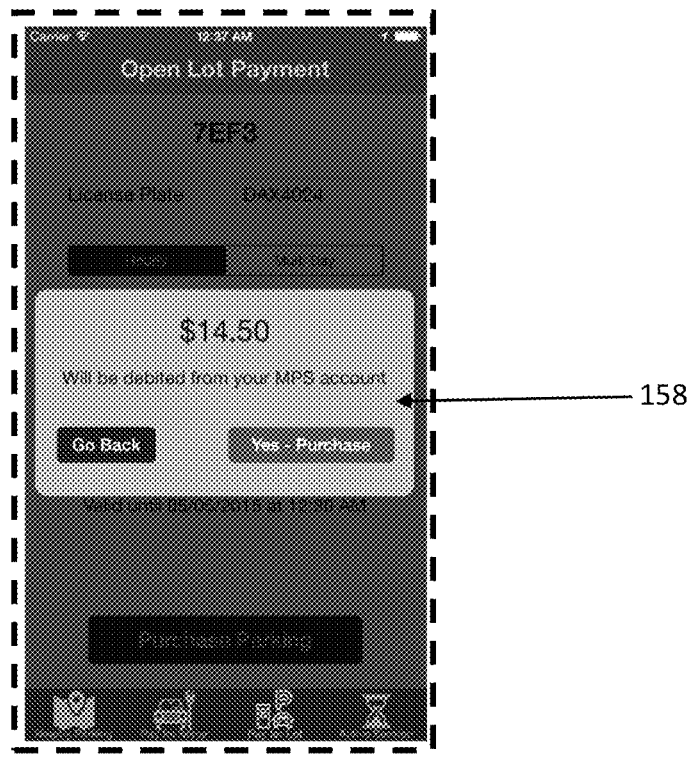
Figure 12:
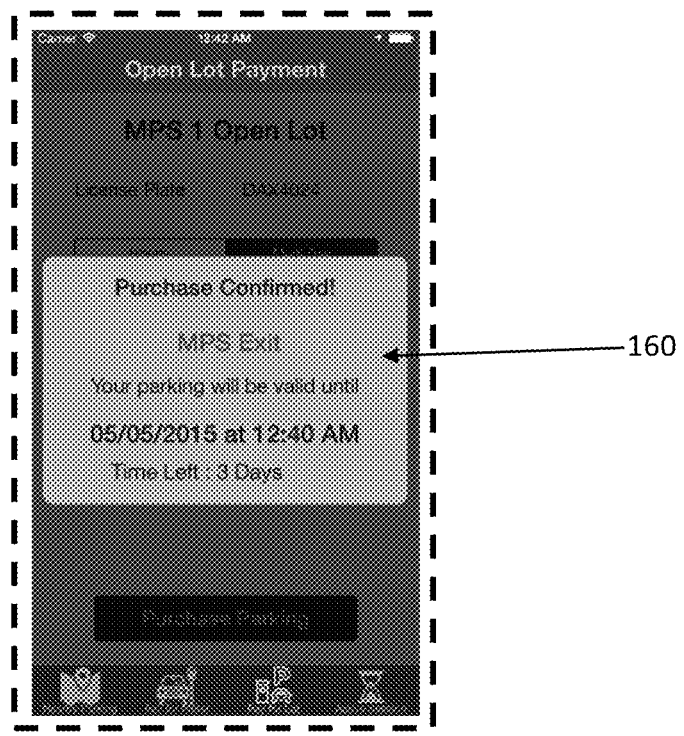

FIGS. 11-12 present a pre-purchase user confirmation window 158 and post-purchase confirmation window 160, respectively, for the parking lot spaces such as in FIGS. 9 and 10.

The parking software application can also be integrated into other computing systems, such as integrated vehicle operation systems. For example, the present software application can be integrated into the vehicle's control and/or navigation systems since that is a mobile computing platform that is typically connected to the Internet. The integration with such vehicle system can be direct via storing of the software in the system's memory, or indirectly via smartphone interfaces such as Apple's CARPLAY and Google's ANDROID AUTO where the software resides on the user's computing device.

In an additional aspect, the parking application can present the user with an option (e.g. via a selectable button in the screen of FIG. 5) to park with handicapped privileges. Often under local municipal rules and statutes, handicapped persons are allowed to park without a fee or for a longer time period or with other benefits that non-handicapped persons do not receive. However, the use of the handicapped option can be inappropriately used by the parker. Thus, the parking application can relay the vehicle license information to the cloud computer for verification against handicapped vehicle databases with the department of motor vehicles. Alternatively, the user may scan in a bar code or QR code appearing on their handicapped identification media, which the software can decipher and recognize whether the user is authorized to park with handicapped privileges.

Note that this application and the appended figures reference certain trademarks and copyrights belonging to Municipal Parking Services, Inc., including the trademark SENTRY and the MPS logo. No rights to use any of these copyrights and trademarks are either express or implied by their mention in this patent application. The mention of these copyrights and trademarks is merely for illustrative purposes.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A parking monitoring system, comprising:
  a first camera positioned to perform a license plate reading of vehicles entering a parking lot;
  a second camera positioned to perform a license plate reading of vehicles exiting the parking lot;
  a central computer system networked with the first and second cameras;
  a kiosk provided to the parking lot, the kiosk comprising:
    a weather resistant housing;
    a processor disposed inside of the housing;

a memory disposed inside of the housing and coupled to the processor;
a network interface disposed in the housing and coupled to the processor; and
a payment acceptance means,
wherein the kiosk is networked with the central computer system; and
a user computing device, comprising a processor, memory and graphical user interface,
wherein the user computing device is networked with the central computer system,
wherein the user computing device is configured to:
  transmit to a request for parking time for the parking lot;
  receive a purchase confirmation from the central computer system; and
  monitor a remaining purchased parking time for the parking lot which is synchronized to a parking timer countdown for the parking lot where the user has parked and where the first camera has performed a license plate reading of the vehicle when entering the parking lot.

2. The system of claim 1, wherein the user computing device is further configured to transmit a request for additional parking time, receive an additional purchase confirmation; and increment the remaining purchased parking time which is synchronized to the parking timer countdown for the particular parking lot where the user has parked.

3. The system of claim 1, wherein the user computing device is further configured to present the user with a parking violation notice in the event that a parking violation has occurred.

4. A method of parking event monitoring where a user parks a vehicle in one of a first parking space or a second parking space, the method comprising:
  providing a first parking meter installed adjacent to the first parking space, the first parking meter comprising:
    a weather resistant housing;
    a processor disposed inside of the housing;
    a memory disposed inside of the housing and coupled to the processor;
    a network interface disposed in the housing and coupled to the processor;
  a camera coupled to the processor and aimed towards the first parking space;
  providing a second parking meter installed adjacent to the second parking space, the second parking meter comprising:
    a weather resistant housing;
    a processor disposed inside of the housing;
    a memory disposed inside of the housing and coupled to the processor;
    a network interface disposed in the housing and coupled to the processor;
  a camera coupled to the processor and aimed towards the second parking space;
  networking the first and second parking meters with a central computing system;
  networking a user computing device with the first and second parking meters and the central computing system;
  transmitting by the user computing device a request for parking time to the respective first parking meter or the second parking meter which corresponds to the one of the first or second parking spaces where the user parked the vehicle;
  receiving by the user computing device from the first or second parking meter, or from the central computing system, a purchase confirmation; and
  monitoring by the user computing device a remaining purchased parking time which is synchronized to a parking time countdown timer of the respective first or the second parking meter that corresponds to the one of the first or second parking spaces where the vehicle is parked.

5. The method of claim 4, further comprising the user computing device transmitting a reservation request to the one of the first and second parking meters, and the one of the first and second parking meters that received the reservation request changing its status to unavailable in response to the reservation request.

6. The method of claim 4, further comprising the user computing device launching a map application residing on the user's computing device to guide the user to a location of the first or second parking space where the vehicle is parked.

7. The method of claim 4, further comprising:
  transmitting by the user computing device a request for additional parking time to the respective first parking meter or the second parking meter which corresponds to the one of the first or second parking spaces where the user parked the vehicle; and
  the respective first parking meter or the second parking meter which corresponds to the one of the first or second parking spaces where the user parked the vehicle incrementing the remaining purchased parking time.

8. The method of claim 4, further comprising:
  automatically reading a license plate data of the vehicle by the respective first parking meter or the second parking meter which corresponds to the one of the first or second parking spaces where the user parked the vehicle;
  entering a license plate data into the user computing device by the user; and
  matching by the central computing system the license plate data entered by the user with the license plate data read by the respective first parking meter or the second parking meter which corresponds to the one of the first or second parking spaces where the user parked the vehicle.

* * * * *